T. I. BURHYTE.
Churn.
No. 62,470.
Patented Feb. 26, 1867.
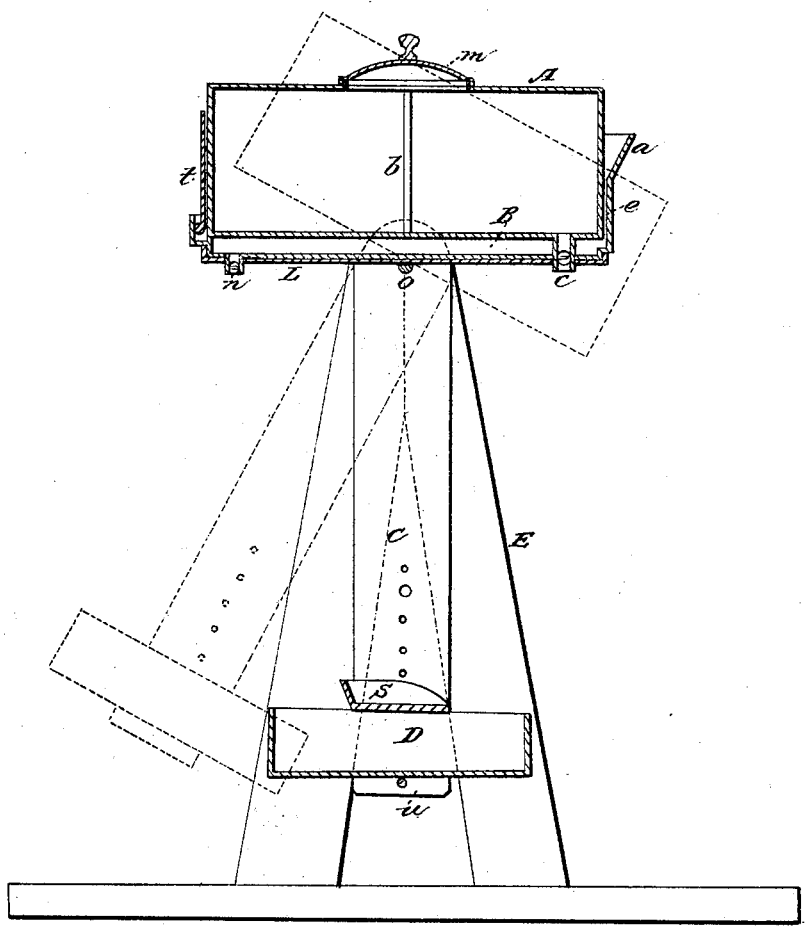
FIG. 1
FIG. 2
WITNESSES:
INVENTOR:
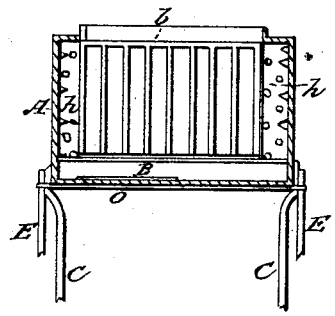

United States Patent Office.

TUNIS I. BURHYTE, OF FOND DU LAC, WISCONSIN.

Letters Patent No. 62,470, dated February 26, 1867.

---

IMPROVEMENT IN CHURNS.

---

The Schedule referred to in these Letters Patent and making part of the same.

---

TO ALL WHOM IT MAY CONCERN:

Be it known that I, TUNIS I. BURHYTE, of Fond du Lac, in the county of Fond du Lac, and State of Wisconsin, have invented certain new and useful Improvements in Churns; and I do hereby declare that the following is a full, clear, and exact description thereof, reference being had to the accompanying drawings making part of this specification, and to the letters of reference marked thereon, like letters indicating like parts wherever they occur.

To enable others skilled in the art to construct and use my invention, I will proceed to describe it.

My invention consists in a novel method of constructing a churn, whereby the temperature of the cream may be regulated as desired, and in mounting the same on an oscillating platform, in such a manner that the swinging of a pendulum, or weight attached to the platform, shall communicate motion to the churn.

Figure 1 is a vertical section; and

Figure 2, a transverse vertical section of the churn.

A represents the churn, which I construct in the form of an oblong rectangular box, as represented in fig. 1. This box may be made of tin or other suitable metal, or the body may be made of wood, provided the bottom be of metal. This box A is provided with a suitable opening, with a cover, $m$, at its top, and has a spout, $c$, for the escape of the buttermilk. Underneath this churn or box A is secured a false bottom, with a space between it and the bottom of the box, thus forming a shallow chamber, B, under the box, into which hot or cold water may be poured, through the funnel $a$, for the purpose of raising or lowering the temperature of the cream as may be desired. This chamber B is provided with a cock, $n$, or with a simple tube for drawing off the water when necessary. In the centre of the box A is placed a grate, $b$, shown more clearly in fig. 2. This grate is made of a width equal to the opening in the top of the box, which, in this case, extends nearly across the box, the spaces between the sides of the rack or grate and the sides of the box, being filled by a perforated plate, $h$, as shown in fig. 2; the grate being arranged to be lifted out for the purpose of cleaning the churn. The churn thus constructed is mounted on a platform, L, suspended or pivoted on a rod, $o$, to an upright frame, E, as shown in fig. 1, there being, of course, two of the supports E, one on each side. To the platform L, on each side, is attached rigidly a bar or rod, $c$, reaching nearly to the bottom of the frame E. A box, D, is arranged between these bars C, so that it can be raised or lowered at will, it being held in place by loops which clasp around the bars E, and by a rod inserted through holes in the bars, underneath the box. By these means the box D may be raised or lowered as desired, thus making the oscillations more or less rapid, according to the amount and condition of the cream in the churn. This box D may be of any desired size, but should be made shallow, so as not to occupy any more space, vertically, than is necessary. Across the top of the box D is arranged a seat, $s$, as shown in fig. 1.

The operation is as follows: The cream to be churned is placed in the box A, and the latter is then placed on the platform L. The temperature is then regulated by pouring hot or cold water into the chamber B through the tube $a$; a thermometer, $t$, being attached to the box A to indicate the temperature. Weights of any kind are previously placed in the box D, which serve to keep the platform and churn in a horizontal position, and prevent them from tipping over. By pushing the box D, a swinging or oscillating motion is imparted to it, and thereby the platform and churn are made to rock to and fro; thus dashing the cream to and fro in the box, and causing it to rush violently through the grate $b$, and dash against the ends, whereby the globules are broken, and the butter produced or separated from the milk. Instead of placing weights in the box D, a child may be seated on the seat $s$, and, either by the aid of others or by its own efforts, may impart a swinging motion to the apparatus; and thus the labor of churning may be turned into a source of amusement, and be performed by children who have not sufficient strength to operate the ordinary dasher churn.

Having thus described my invention, what I claim, is—

1. The churn A, provided with the water-chamber B at its bottom, and the removable grate $b$, and having the tubes $a$, $c$, and $n$, arranged as shown and described.

2. In combination with the platform L, pivoted to the supports E, I claim the pendulum rods C, and the adjustable box D, or it equivalent, arranged to operate as set forth.

T. I. BURHYTE.

Witnesses:
    W. C. DODG,
    P. T. DODGE.